United States Patent
Zhou et al.

(10) Patent No.: US 7,372,218 B2
(45) Date of Patent: May 13, 2008

(54) OPEN PROTECTION CIRCUIT FOR BACKLIGHT MODULE

(75) Inventors: Tong Zhou, Shenzhen (CN); Huai-Zhu Yan, Shenzhen (CN); Kun Le, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/604,620

(22) Filed: Nov. 27, 2006

(65) Prior Publication Data

US 2007/0120503 A1     May 31, 2007

(51) Int. Cl.
  *H05B 37/02*  (2006.01)
  *H02H 3/08*  (2006.01)
(52) U.S. Cl. ............... 315/308; 315/312; 361/93.7
(58) Field of Classification Search ............ 315/209 R, 315/224, 246, 250, 268, 291, 307–308, 312, 315/362; 345/102; 361/93.1, 93.7, 93.9
  See application file for complete search history.

(56) References Cited

U.S. PATENT DOCUMENTS

| 5,680,017 | A | | 10/1997 | Veldman et al. |
|---|---|---|---|---|
| 5,923,129 | A | * | 7/1999 | Henry ..................... 315/307 |
| 6,011,360 | A | | 1/2000 | Gradzki et al. |
| 6,084,360 | A | | 7/2000 | Yokokawa et al. |
| 6,376,999 | B1 | | 4/2002 | Li et al. |
| 6,947,024 | B2 | * | 9/2005 | Lee et al. .................. 345/102 |
| 2005/0127851 | A1 | * | 6/2005 | Song et al. ................. 315/291 |
| 2005/0253537 | A1 | * | 11/2005 | Jang et al. .................. 315/307 |
| 2005/0269970 | A1 | * | 12/2005 | Jang et al. .................. 315/291 |

* cited by examiner

*Primary Examiner*—Thuy V. Tran
*Assistant Examiner*—Tung X Le
(74) *Attorney, Agent, or Firm*—Wei Te Chung

(57) ABSTRACT

An open protection circuit (300) for a backlight module includes a PWM (350) with a control port (351) to disable the PWM. A switch (371) has a gate and a source connected to the control port. A plurality of first input circuits (330) includes first diodes (331), each of which has a first positive terminal connected to the gate and a negative terminal connected to ground. A plurality of second input circuits (340) include input resistors (341) connected to the control port. A plurality of detecting circuits (310, 380) are connected to the fluorescent lamps (311) and the first and second input circuits respectively. Each detecting circuit includes a sampling resistor (313) connected to one of the negative terminals of the first diodes, thereby the control port of the PWM is pulled low when either one of the fluorescent lamps are open-circuit.

15 Claims, 3 Drawing Sheets

OPEN PROTECTION CIRCUIT FOR BACKLIGHT MODULE

BACKGROUND OF THE INVENTION

1. Field of the Invention

The present invention relates to protection circuits, and in particular to an open protection circuit for a backlight module that uses fluorescent lamps.

2. General Background

Liquid crystal displays (LCDs) generally have the advantages of lightness in weight, a thin profile, flexible sizing, and low power consumption. For these reasons, LCDs are widely used in products such as laptops, personal digital assistants, mobile phones, and so on.

An LCD typically includes an LCD panel and a backlight module. The backlight module commonly includes fluorescent lamps, and acts as a light source for the LCD panel. Thereby, liquid crystal in the LCD panel can provide images for a display screen of the LCD panel. Conventional backlight modules for LCDs generally utilize pulse width modulators (PWMs) to control working currents of the fluorescent lamps. An open protection circuit is also provided to protect the PWM from damage when one of the fluorescent lamps fails or when an open circuit occurs for some other reason.

FIG. 3 is a diagram of a conventional open protection circuit of a backlight module that uses four fluorescent lamps. The fluorescent lamps are typically cold cathode fluorescent lamps (CCFLs). The open protection circuit 100 includes four detecting circuits 110, an input circuit 130, a PWM 150, and a switch 170.

Each of the detecting circuits has an output port 112, and is connected to a respective one of the fluorescent lamps 111. The input circuit 130 has four branches which correspond to the four fluorescent lamps 111. Each branch input circuit includes a bias resistor 132, a filtering capacitor 133, and a transistor. The transistors of the four branch circuits are designated 1331, 1332, 1333, 1334. The source terminal of the first transistor 1331 is connected to the drain terminal of the second transistor 1332. The source terminal of the second transistor 1332 is connected to the drain terminal of the third transistor 1333. The source terminal of the third transistor 1333 is connected to the drain terminal of the fourth transistor 1334. The source terminal of the fourth transistor 1334 is connected to ground. The drain terminal of the first transistor 1331 is utilized an output port of the input circuit 130.

The gate terminal of the first transistor 1331 in the first branch of the input circuit 130 is connected to ground via a bias resistor 132 and a filtering capacitor 135, which are arranged in parallel. The positive terminal of the diode 131 in the first branch acts as one of the input ports of the input circuit 130. The second, third, and fourth transistors 1332~1334 in the other three branches are respectively connected to the other three bias resistors 132, filtering capacitors 135 and diodes 131 in similar arrangements to that of first branch. The positive terminals of the diodes 131 in the other three branches act as the other three input ports of the input circuit 130, in similar fashion to the diode 131 in the first branch.

The PWM 150 has a control port 151. The PWM 150 can be turned off or disabled when a low voltage level is provided to the control port 151 thereof.

The switch 170 includes a fifth transistor 171 and a current restriction resistor 172. The source terminal of the fifth transistor 171 is connected to ground, and the drain terminal of the fifth transistor 171 is connected to the control port 151 of the PWM 150. The gate terminal of the fifth transistor 170 and the drain terminal of the first transistor 1331 are both connected to a 5V power source provided by a pin of the PWM 150 via the current restriction resistor 172.

When the fluorescent lamps 111 are ignited and function normally, the four output ports 112 of the detecting circuits 110 are in a high voltage state. Thereby, the four output ports 112 enable the first through fourth transistors 1331~1334, and pull the gate terminal of the fifth transistor 171 into a low voltage state. Simultaneously, the fifth transistor 171 is disabled. The control port 151 of the PWM 150 maintains a high voltage level, which keeps the PWM 150 functioning.

When any one of the fluorescent lamps 111 has an open circuit, the output port 112 of the corresponding detecting circuit 110 is pulled to a low voltage state, which disables a corresponding one of the four transistors 1331~1334. The gate terminal of the fifth transistor 171 is then enabled by a high voltage provided by the 5V power source from the PWM 150. Simultaneously, the control port 151 of the PWM 150 is pulled to a low voltage state, and the PWM 150 is disabled.

At least one transistor 1331~1334 and many passive electronic components are required for each one of the fluorescent lamps 111 in order to implement the open protection circuit 100. That is, the open protection circuit 100 is complicated and costly. This problem is even more pronounced in the case of a backlight module that has more than four fluorescent lamps 111. Hence, there is a need for a simpler and inexpensive open protection circuit for a backlight module.

SUMMARY

Embodiments of the invention provide an open protection circuit for a backlight module that uses fluorescent lamps.

One embodiment of the invention provides an open protection circuit including a pulse width modulator (PWM) having a control port, a switch, a first and a second input circuits, and a first and a second detecting circuits. The control port is configured to disable the pulse width modulator according to a predetermined signal. The switch has a gate terminal and a drain terminal connected to the control port. The first input circuit includes a first diode with a first positive terminal connected to the gate terminal and a first negative terminal connected to ground. The second input circuit includes a first input resistor connected to the control port at one end. The first detecting circuit includes a first sampling resistor connected to a first fluorescent lamp and the first negative terminal at one end and connected to ground at the other. The second detecting circuit includes a second sampling resistor connected to a second fluorescent lamp and the control port via the first input resistor at one end and connected to ground at the other, thereby the control port of the PWM pulled to ground, disabling the PWM when either one of the first and second fluorescent lamps are open-circuit.

Furthermore, the open protection circuit provided in the above first embodiment can further include a third and a fourth input circuits, and a third and a fourth detecting circuits. The third input circuit includes a second diode with a second positive terminal connected to the gate terminal of the switch and a second negative terminal connected to ground. The fourth input circuit includes a second input resistor connected to the control port at one end. The third detecting circuit includes a third sampling resistor connected to a third fluorescent lamp and the second negative terminal at one end and connected to ground at the other. The fourth detecting circuit includes a fourth sampling resistor connected to a fourth fluorescent lamp and the control port of the PWM via the second input resistor at one end and connected to ground at the other, thereby the control port of the PWM pulled to ground, disabling the PWM when either one of the third and fourth fluorescent lamps are open-circuit.

The switch is a transistor, or a (positive-negative-positive) PNP type transistor as an example. The open protection circuit further includes a current restriction resistor connected to the gate terminal of the transistor and an external power source. The first input circuit includes a first capacitor disposed between the first negative terminal of the first diode and ground, and the third input circuit includes a second capacitor disposed between the second negative terminal of the second diode and ground. The exemplary capacitances of the first capacitor and the second capacitor are 0.22 µF. The exemplary resistances of the first input resistor and the second input resistor are 3.9KΩ. The resistances of the first, second, third, and fourth sampling resistors are 560 Ω.

Another embodiment of the invention provides an open protection circuit including a PWM having a control port. The control port is configured to disable the pulse width modulator according to a predetermined signal. A switch has a gate terminal and a drain terminal connected to the control port. A plurality of first input circuits include first diodes, and each of the first diodes has a first positive terminal connected to the gate terminal and a first negative terminal connected to ground. A plurality of second input circuits include first input resistors, and each of first input resistors is connected to the control port at one end. A plurality of first detecting circuit and second detecting circuit are provided and connected to the fluorescent lamps. Each of the first detecting circuit includes a first sampling resistor connected to one of the fluorescent lamps and one of the first negative terminals of the first diodes at one end and connected to ground at the other. Each of the second detecting circuit includes a second sampling resistor connected to one of the other fluorescent lamps and the control port via one of the first input resistors of the second input circuits at one end and connected to ground at the other, thereby the control port of the PWM can be pulled to ground, disabling the PWM when either one of the fluorescent lamps are open-circuit.

Furthermore, backlight modules incorporating the above exemplary open protection circuits are also provided. A detailed description of various embodiments is given below with reference to the accompanying drawings.

DETAILED DESCRIPTION

Figure 1:
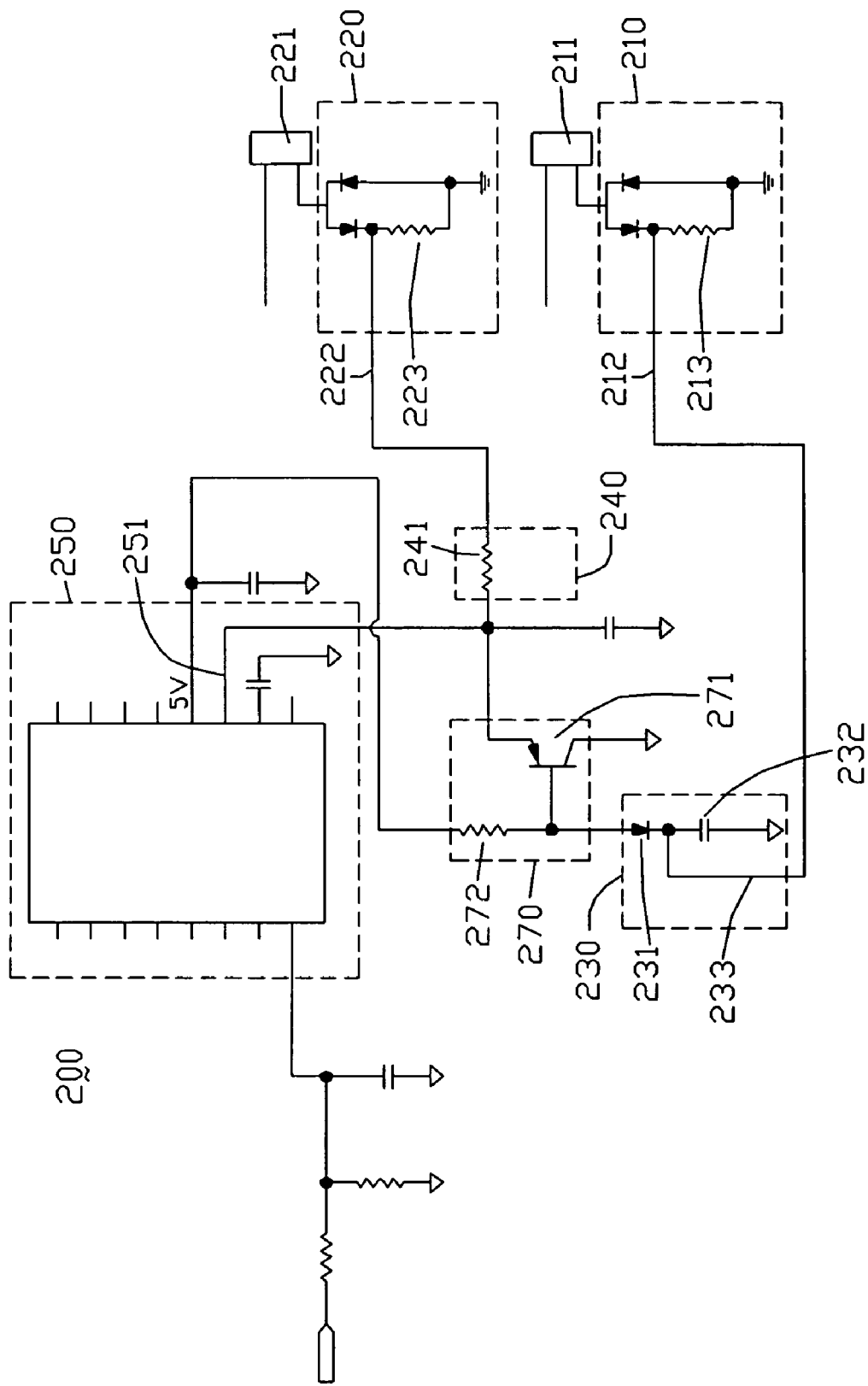
FIG. 1 is a diagram of an open protection circuit for a backlight module that uses fluorescent lamps, in accordance with a first exemplary embodiment of the present invention.

FIG. 1 shows a diagram of an open protection circuit 200 for a backlight module that uses fluorescent lamps, in accordance with a first embodiment of the present invention. The backlight module utilizes two fluorescent lamps 211 and 221. The fluorescent lamps 211 and 221 cooperatively serve as a light source for a liquid crystal display (LCD), and can for example be cold cathode fluorescent lamps (CCFLs) or hot cathode fluorescent lamps (HCFLs). The open protection circuit 200 includes a pulse width modulator (PWM) 250, a switch 270, a first and a second input circuits 230, 240, and a first and a second detecting circuits 210, 220.

The PWM 250 has a control port 251. The control port 251 disables the PWM 250 when the control port 251 is pulled to a low voltage state. The switch 270 includes a transistor 271 and a current restriction resistor 272. A gate terminal of the transistor 271 is connected to a 5V DC power source provided by a pin of the PWM 250 via the current restriction resistor 272. A source terminal of the transistor 271 is connected to the control port 251 of the PWM 250, and a drain terminal of the transistor 271 is connected to ground.

The first input circuit 230 includes a diode 231 and a filtering capacitor 232. A positive terminal of the diode 231 is connected to the gate terminal of the transistor 271, and to the power pin of the PWM 250 via the current restriction resistor 272. A negative terminal of the diode 271 is connected to ground via the filtering capacitor 232, which can filter out high frequency noise. A first input port 233 of the first input circuit 230 is connected to the negative terminal of the diode 231.

The first detecting circuit 210 is connected to one terminal of a fluorescent lamp 211, and includes a sampling resistor 213 and two rectification diodes (not labeled). One end of the sampling resistor 213 is connected to ground. An opposite end of the sampling resistor 213 is connected to the fluorescent lamp 211 via a negative terminal of one of the rectification diodes. An output port 212 of the first detecting circuit 210 is connected to the negative terminal of the same one rectification diode, and is also connected to the input port 233 of the first input circuit 230.

The second input circuit 240 includes an input resistor 241. The input resistor 241 is connected to the control port 251, the source terminal of the transistor 271, and ground via a capacitor (not labeled).

The second detecting circuit 220 is connected to one terminal of a fluorescent lamp 221, and has a similar structure to that of the first detecting circuit 210. The second detecting circuit 220 includes a sampling resistor 223 and two rectification diodes (not labeled). One end of the sampling resistor 223 is connected to ground, and an opposite end of the sampling resistor 223 is connected to the fluorescent lamp 221 via a negative terminal of one of the rectification diodes. An output port 222 of the second detecting circuit 220 is connected to the negative terminal of the same one rectification diode, and is also connected to the input resistor 241 of the second input circuit 240.

In this exemplary embodiment, the PWM 250 is an OZ9910G PWM control chip. The transistor 271 is a PNP type transistor. The current restriction resistor 272 has a resistance of about 10KΩ. The diode 231 of the first input circuit 230 and the unlabeled rectification diodes in the first and second detecting circuits 210, 220 are SN4148 diodes. The filtering capacitor has a capacitance of about 0.022 µF. The input resistor 241 of the second input circuit 240 has a resistance of about 3.9KΩ. The sampling resistors 213, 223 in the first and second detecting circuits 210, 220 each have a resistance of about 560 Ω.

When the fluorescent lamps 211, 221 are ignited and function normally, the output ports 212, 222 of the first and second detecting circuits 210, 220 each output a high voltage of about 3.6V. The 3.6V high voltage provided by the output port 212 disables the transistor 271 of the switch 270. The 3.6V high voltage provided by the output port 222 maintains the control port 251 of the PWM 250 in a high voltage state, which keeps the PWM 250 functioning.

When the fluorescent lamp 211 connected to the first detecting circuit 210 fails or has an open circuit, the output port 212 is pulled to a low voltage state of about 0.067V. Simultaneously, the transistor 271 is enabled. The control port 251 of the PWM 250 is pulled to a low voltage state, which disables the PWM 250. Thus the PWM 250 is protected from high voltage currents or impulses.

When the fluorescent lamp 221 connected to the second detecting circuit 220 fails or has an open circuit, the output port 222 is pulled to a low voltage state of about 0.067V. Simultaneously, the control port 251 of the PWM 250 is directly pulled to a low voltage state, which disables the PWM 250. Thus the PWM 250 is protected from high voltage currents or impulses.

Unlike a conventional open protection circuit such as the open protection circuit 100, the structure of the open protection circuit 200 is relatively simple. Thus, the cost of the open protection circuit 200 can be reduced.

Figure 2:
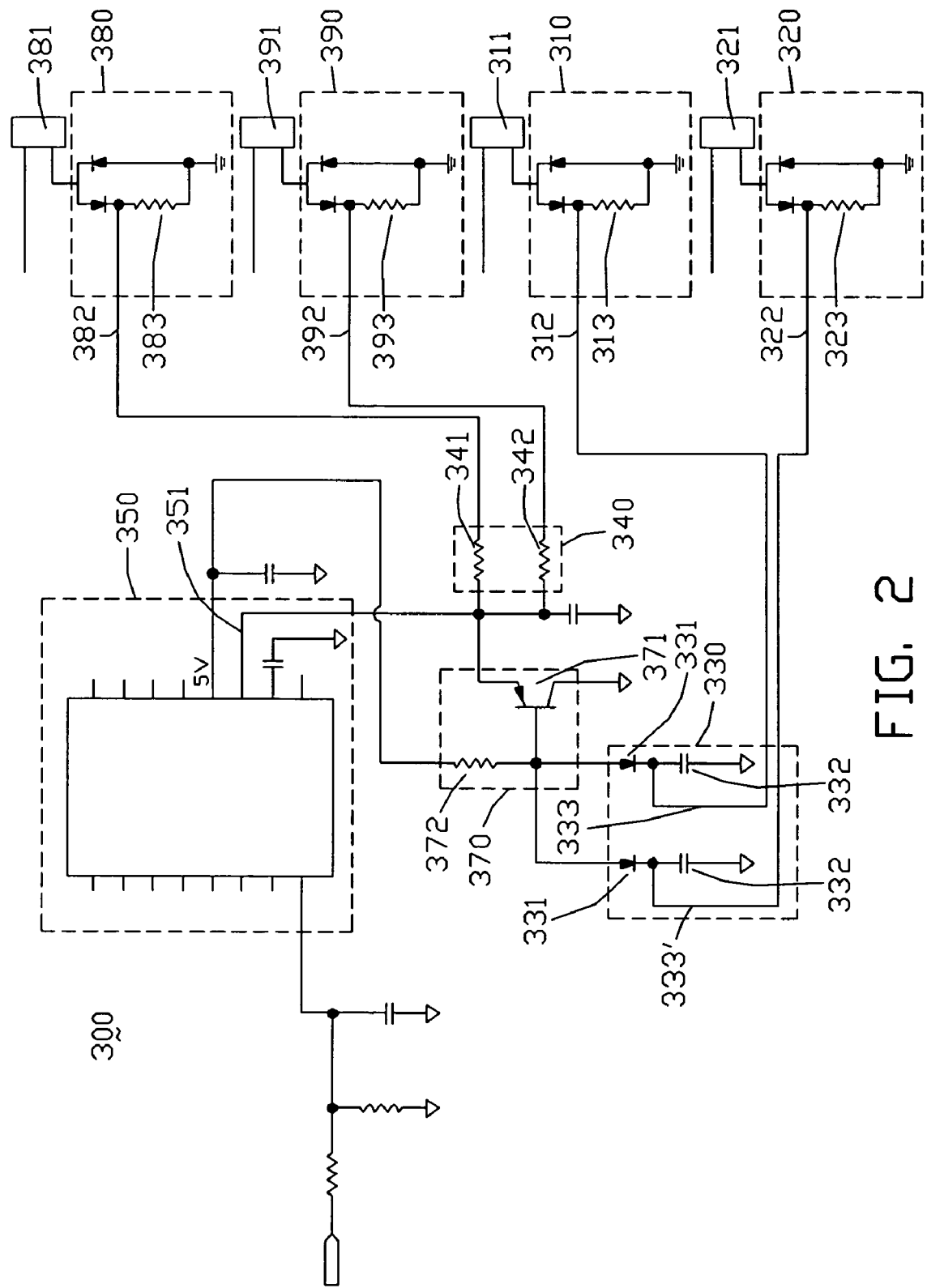
FIG. 2 is a diagram of an open protection circuit for a backlight module that uses fluorescent lamps, in accordance with a second exemplary embodiment of the present invention.
Figure 3:
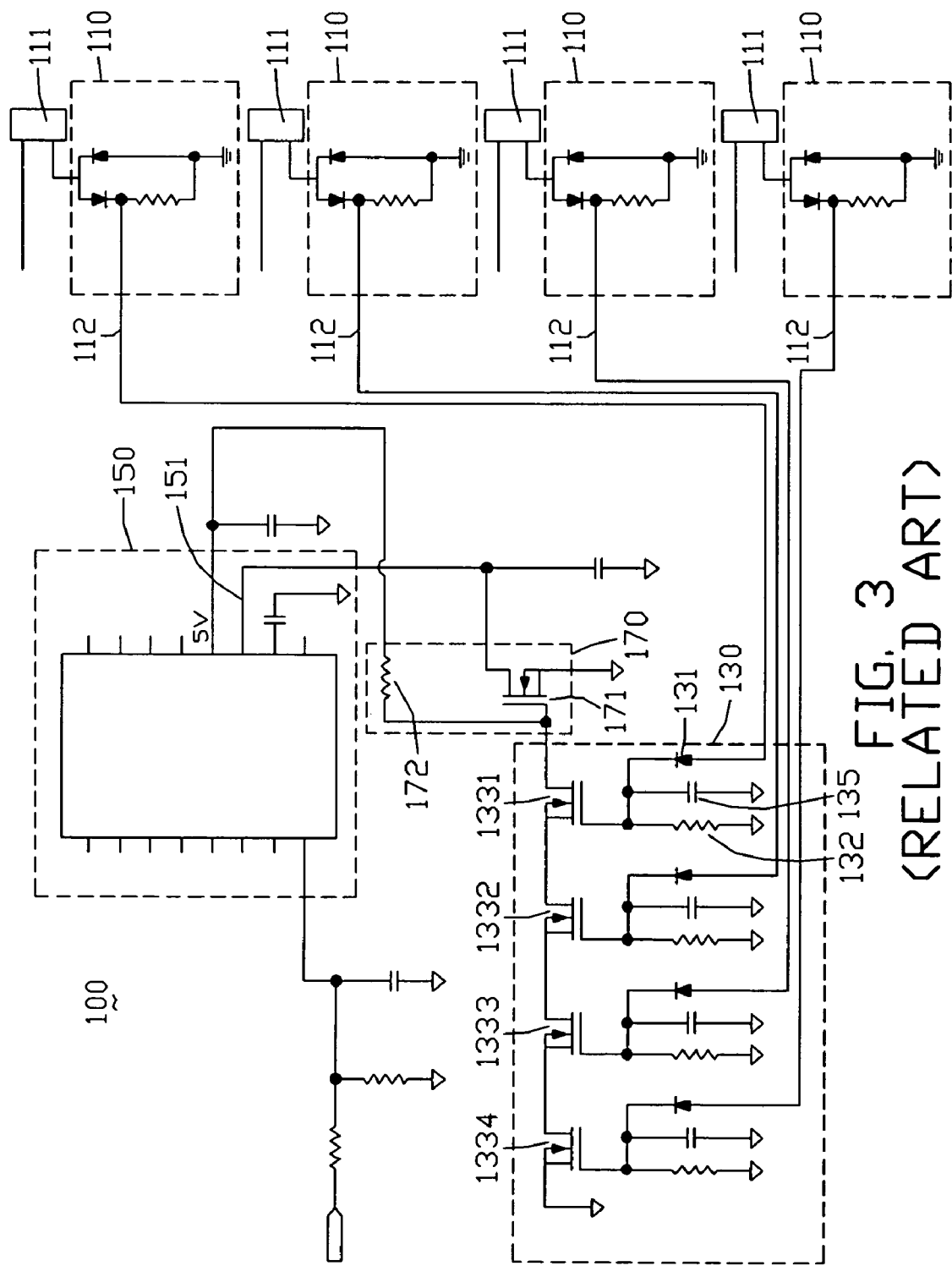
FIG. 3 is a diagram of a conventional open protection circuit for a backlight module that uses fluorescent lamps.

FIG. 2 is a diagram of an open protection circuit 300 for a backlight module that uses fluorescent lamps, in accordance with a second exemplary embodiment of the present invention. The open protection circuit 300 has a similar structure to that of the first embodiment, and can be applied to a backlight module that has four or more fluorescent lamps. In order to simplify the drawing and following description of the open protection circuit 300, only four fluorescent lamps 311, 321, 381, and 391 are shown in FIG. 2 and described below.

The open protection circuit 300 includes a PWM 350, a switch 370, a first and a second input circuits 330, 340, and a first, a second, a third, and a fourth detecting circuits 310, 320, 380, and 390.

The PWM 350 has a control port 351. The control port 351 disables the PWM 350 when the control port 351 is pulled to a low voltage state. The switch 370 includes a transistor 371 and a current restriction resistor 372. A gate terminal of the transistor 371 is connected to a 5V DC power source provided by a pin of the PWM 350 via the current restriction resistor 372. A source terminal of the transistor 371 is connected to the control port 351 of the PWM 350, and a drain terminal of the transistor 371 is connected to ground.

The first input circuit 330 is separated into two branches, and includes two diodes 331 and two filtering capacitors 332. In each branch of the first input circuit 330, a positive terminal of the diode 331 is connected to the gate terminal of the transistor 371, and to the power pin of the PWM 350 via the current restriction resistor 372. A negative terminal of each diode 331 is connected to ground via the corresponding filtering capacitor 332, which can filter out high frequency noise. Furthermore, the first input circuit 330 has two input ports 333, 333' connected with the negative terminals of the diodes 331 in each branch respectively.

The second input circuit 340 includes two input resistors 341, 342 separated into two branches. The input resistors 341, 342 are each connected to the control port 351, the source terminal of the transistor 371, and ground via a capacitor (not labeled).

The first detecting circuit 310 is connected to one terminal of a fluorescent lamp 311, and includes a sampling resistor 313 and two rectification diodes (not labeled). One end of the sampling resistor 313 is connected to ground. The opposite end of the sampling resistor 313 is connected to the fluorescent lamp 311 via a negative terminal of one of the rectification diodes. An output port 312 of the first detecting circuit 310 is connected to the negative terminal of the same one rectification diode, and is also connected to the input port 333 of the first input circuit 330.

The second detecting circuit 320 is connected to one terminal of a fluorescent lamp 321, and has a similar structure to that of the first detecting circuit 310. The second detecting circuit 320 includes a sampling resistor 323 and two rectification diodes (not labeled). One end of the sampling resistor 323 is connected to ground. The opposite end of the sampling resistor 313 is connected to the fluorescent lamp 321 via a negative terminal of one of the rectification diodes. An output port 322 of the second detecting circuit 320 is connected to the negative terminal of the same one rectification diode, and is also connected to the input port 333' of the first input circuit 330.

The third detecting circuit 380 is connected to one terminal of a fluorescent lamp 381, and has a similar structure to that of the first detecting circuit 310. The third detecting circuit 380 includes a sampling resistor 383, and two rectification diodes (not labeled). One end of the sampling resistor 383 is connected to ground. The opposite end of the sampling resistor 383 is connected to the fluorescent lamp 381 via a negative terminal of one of the rectification diodes. An output port 382 of the third detecting circuit 380 is connected to the negative terminal of the same one rectification diode, and is also connected to the input resistor 341 of the second input circuit 340.

The fourth detecting circuit 390 is connected to one terminal of a fluorescent lamp 391, and has a similar structure to that of the first detecting circuit 310. The fourth detecting circuit 390 includes a sampling resistor 393, and two rectification diodes (not labeled). One end of the sampling resistor 393 is connected to ground. The opposite end of the sampling resistor 393 is connected to the fluorescent lamp 391 via a negative terminal of one of the rectification diodes. An output port 392 of the fourth detecting circuit 390 is connected to the negative terminal of the same one rectification diode, and is also connected to the input resistor 342 of the second input circuit 340.

When the fluorescent lamps 311, 321, 381, 391 are ignited and function normally, the output ports 312, 322, 382, 392 of the first through fourth detecting circuits 310, 320, 380, 390 each output a high voltage of about 3.6V. The 3.6V high voltage provided by the output ports 312 and 322 disables the transistor 371 of the switch 370. The 3.6V high voltage provided by the output ports 382 and 392 maintains the control port 351 of the PWM 350 in a high voltage state, which keeps the PWM 350 functioning.

When either of the fluorescent lamps 311, 321 connected to the first and second detecting circuits 310, 320 fails or has an open circuit, the corresponding output port 312 or 322 is pulled to a low voltage state of about 0.067V. Simultaneously, the transistor 371 is enabled. The control port 351 of the PWM 350 is pulled to a low voltage state, which disables the PWM 350. Thus the PWM 350 is protected from high voltage currents or impulses.

When either of the fluorescent lamps 381, 391 connected to the third and fourth detecting circuit 380, 390 fails or has an open circuit, the corresponding output port 382 or 392 is pulled to a low voltage state of about 0.067V. Simultaneously, the control port 351 of the PWM 350 is directly pulled to a low voltage state, which disables the PWM 350. Thus the PWM 350 is protected from high voltage currents or impulses.

The open protection circuit 300 can protect the PWM 350 without the need for additional transistors. Thus the structure of the open protection circuit 300 is relatively simple, and the cost of the open protection circuit 300 can be reduced.

While the above description has been by way of examples and in terms of preferred embodiments, it is to be understood that the invention is not limited thereto. To the contrary, the above description is intended to cover various modifications and similar arrangements as would be apparent to those skilled in the art. Therefore, the scope of the appended claims should be accorded the broadest interpretation so as to encompass all such modifications and similar arrangements.

We claim:

1. An open protection circuit for a backlight module that includes a plurality of fluorescent lamps, the open protection circuit comprising:
    a pulse width modulator having a control port, the control port being configured to disable the pulse width modulator according to a predetermined signal;
    a switch having a gate terminal, and a source terminal connected to the control port;
    a first input circuit including a first diode, a first positive terminal of the first diode connected to the gate terminal of the switch, and a first negative terminal of the first diode connected to ground;
    a second input circuit including a first input resistor, one end of the first input resistor connected to the control port;
    a first detecting circuit including a first sampling resistor, one end of the first sampling resistor connected to a first one of the fluorescent lamps and the first negative terminal of the first diode, and another end of the first sampling resistor connected to ground; and
    a second detecting circuit including a second sampling resistor, one end of the second sampling resistor connected to a second one of the fluorescent lamps, and to the control port via the first input resistor, and another end of the second sampling resistor connected to ground;
    wherein the control port is pulled to a low voltage state when either of the first or second fluorescent lamps has an open circuit.

2. The open protection circuit as claimed in claim 1, further comprising:
    a third input circuit including a second diode, a second positive terminal of the second diode connected to the gate terminal of the switch, and a second negative terminal of the second diode connected to ground;
    a fourth input circuit including a second input resistor, one end of the second input resistor connected to the control port;
    a third detecting circuit including a third sampling resistor, one end of the third sampling resistor connected to a third one of the fluorescent lamps and the second negative terminal of the second diode, and another end of the third sampling resistor connected to ground; and
    a fourth detecting circuit including a fourth sampling resistor, one end of the fourth sampling resistor connected to a fourth fluorescent lamp, and to the control port via the second input resistor, and another end of the fourth sampling resistor connected to ground;
    wherein the control port is pulled to a low voltage state when either of the third or fourth fluorescent lamps has an open circuit.

3. The open protection circuit as claimed in claim 2, wherein a capacitance of each of the first capacitor and the second capacitor is approximately 0.22 μF.

4. The open protection circuit as claimed in claim 2, wherein a resistance of each of the first input resistor and the second input resistor is approximately 3.9KΩ.

5. The open protection circuit as claimed in claim 2, wherein a resistance of each of the first, second, third, and fourth sampling resistors is approximately 560Ω.

6. The open protection circuit as claimed in claim 1, wherein the first input circuit further includes a first capacitor connected between the first negative terminal of the first diode and ground, and the third input circuit further includes a second capacitor connected between the second negative terminal of the second diode and ground.

7. The open protection circuit as claimed in claim 1, wherein the switch is a transistor.

8. The open protection circuit as claimed in claim 7, wherein the transistor is a positive-negative-positive (PNP) type transistor.

9. The open protection circuit as claimed in claim 1, further comprising a current restriction resistor connected between the gate terminal of the switch and a power source.

10. An open protection circuit for a backlight module that includes a plurality of fluorescent lamps, the open protection circuit comprising:
    a pulse width modulator having a control port, the control port being configured to disable the pulse width modulator according to a predetermined signal;
    a switch having a gate terminal, and a source terminal connected to the control port;
    a plurality of first input circuits, each of the first input circuits including a first diode with a first positive terminal connected to the gate terminal and a first negative terminal connected to ground;
    a plurality of second input circuits, each of the second input circuits including an input resistor, one end of the input resistor connected to the control port;
    a plurality of first detecting circuits, each of the first detecting circuits including a first sampling resistor, one end of the first sampling resistor connected to a respective one of the fluorescent lamps, and to the first negative terminal of a respective one of the first diodes, another end of the first sampling resistor connected to ground; and
    a plurality of second detecting circuits, each of the second detecting circuits including a second sampling resistor, one end of the second sampling resistor connected to a respective one of the fluorescent lamps, and to the control port via the input resistor of a respective one the second input circuits, another end of the second sampling resistor connected to ground;
    wherein the control port is pulled to a low voltage state when any one of the fluorescent lamps has an open circuit.

11. The open protection circuit as claimed in claim 10, wherein each first input circuit further includes a first capacitor connected between the first negative terminal of the first diode and ground.

12. The open protection circuit as claimed in claim 10, wherein the switch is a transistor.

13. The open protection circuit as claimed in claim 12, wherein the transistor is a positive-negative-positive (PNP) type transistor.

14. The open protection circuit as claimed in claim 10, further comprising a current restriction resistor connected between the gate terminal of the switch and a power source.

15. A backlight module, comprising:
    a plurality of fluorescent lamps; and
    an open protection circuit comprising:

a pulse width modulator having a control port, the control port being configured to disable the pulse width modulator according to a predetermined signal;
a switch having a gate terminal and a source terminal connected to the control port;
a plurality of first input circuits, each of the first input circuits including a first diode with a first positive terminal connected to the gate terminal and a first negative terminal connected to ground;
a plurality of second input circuits, each of the second input circuits including an input resistor connected to the control port at one end;
a plurality of first detecting circuits, each of the first detecting circuits including a first sampling resistor connected to one of the fluorescent lamps and one of the first negative terminals of the first diodes at one end and connected to ground at the other; and
a plurality of second detecting circuits, each of the second detecting circuits including a second sampling resistor connected to one of the other fluorescent lamps which is not connected to the first detecting circuit and the control port via one of the input resistors of the second input circuits at one end and connected to ground at the other;
wherein the control port of the pulse width modulator pulled to a low voltage state when either one of the fluorescent lamps are open-circuit.

* * * * *